Nov. 24, 1953  W. H. PHELPS  2,660,019
FRONT WHEEL MOUNTING FOR MOWERS
Filed March 18, 1950  2 Sheets-Sheet 1

Inventor:
William H. Phelps
By:
Schroeder, Merriam, Hofgren & Brady
Attorneys

Nov. 24, 1953  W. H. PHELPS  2,660,019
FRONT WHEEL MOUNTING FOR MOWERS
Filed March 18, 1950  2 Sheets-Sheet 2
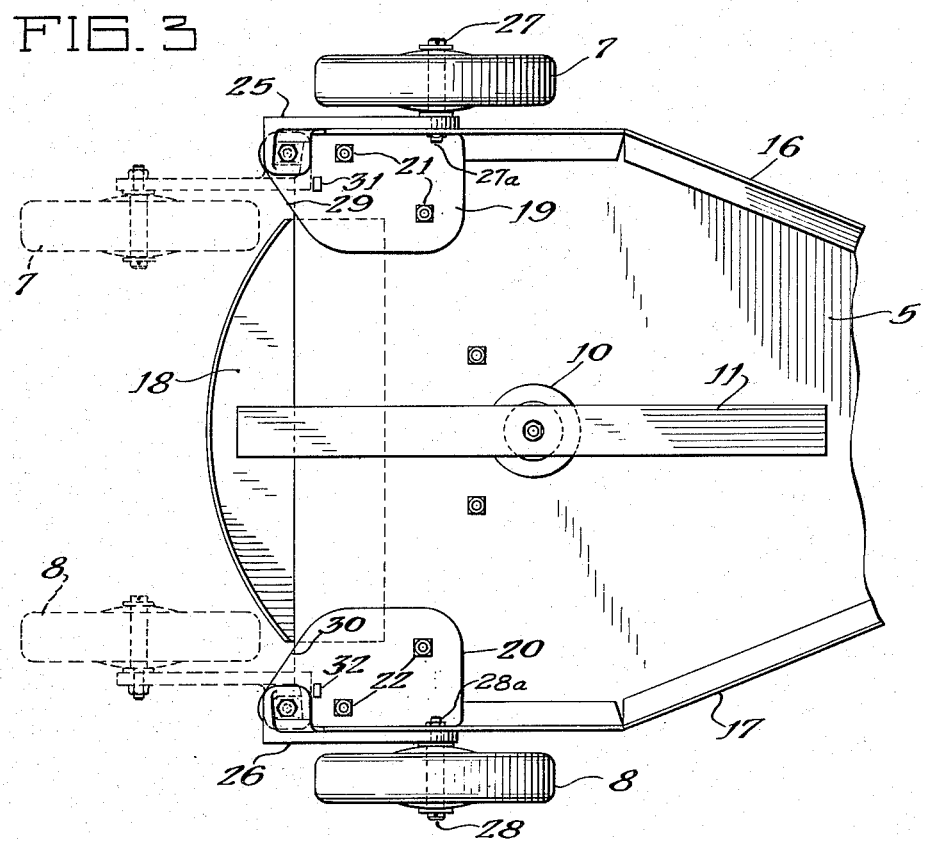
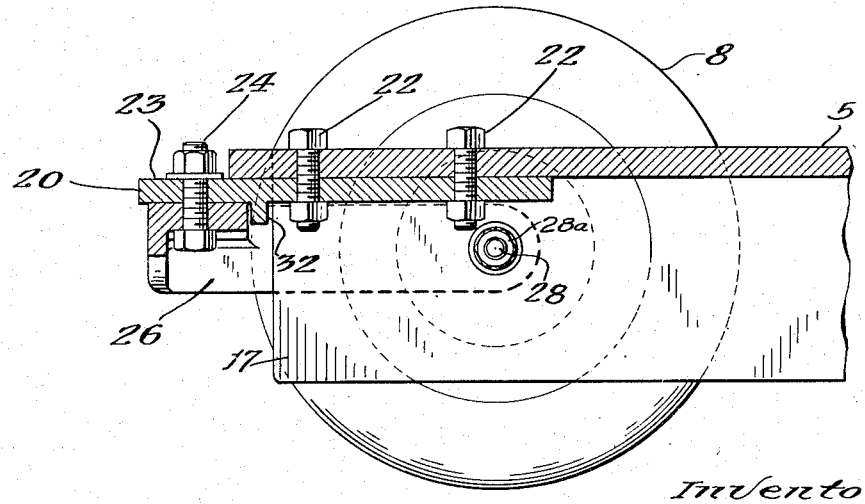
Inventor:
William H. Phelps
By:
Schroeder, Merriam, Hofgren & Brady
Attorneys Patented Nov. 24, 1953

2,660,019

UNITED STATES PATENT OFFICE 2,660,019

FRONT WHEEL MOUNTING FOR MOWERS

William H. Phelps, Ralston, Nebr.

Application March 18, 1950, Serial No. 150,380

7 Claims. (Cl. 56—255)

This invention relates to power mowers, and more particularly to an improved front wheel mounting for mowers of the type having a horizontally rotating mower blade beneath a frame supported on four wheels.

Mowers of this type ordinarily have a platform carried on four wheels, a motor mounted on the platform, and a rotatable vertical shaft journalled in the platform with a mower blade at its lower end, the shaft being driven off the motor. As a rule such mowers have a depending protective skirt along each side of the platform and extending slightly below the level of the mower blades, and an arcuate protective skirt forward of the platform. The front wheels are customarily mounted alongside the platform, outside the protective skirts. Thus, when the mower is run close to a fence or a wall any grass or weeds between the extremity of the front wheel spindle and the ends of the mower blades remains uncut. This difficulty may be overcome by mounting the front wheels forward of the platform; but in that case it is impossible to approach closely to a wall or a fence with the front of the mower, and the mower is somewhat less stable because of the relatively narrow front tread width.

The principal object of the invention is, therefore, to provide a front wheel mounting which permits the front wheels to be pivoted 180° from a laterally extended retracted position alongside the mower platform to a reversed, forwardly extending position, so that the mower may be operated with the wheels in either position depending upon the particular conditions which are encountered.

A further object is to provide such a mounting which may be readily installed in place of the fixed front wheels of the conventional mower.

A further object is to provide a mounting which includes guide faces forward of the platform to direct weeds at the edge of the platform into the path of the mower blades.

Figure 1:
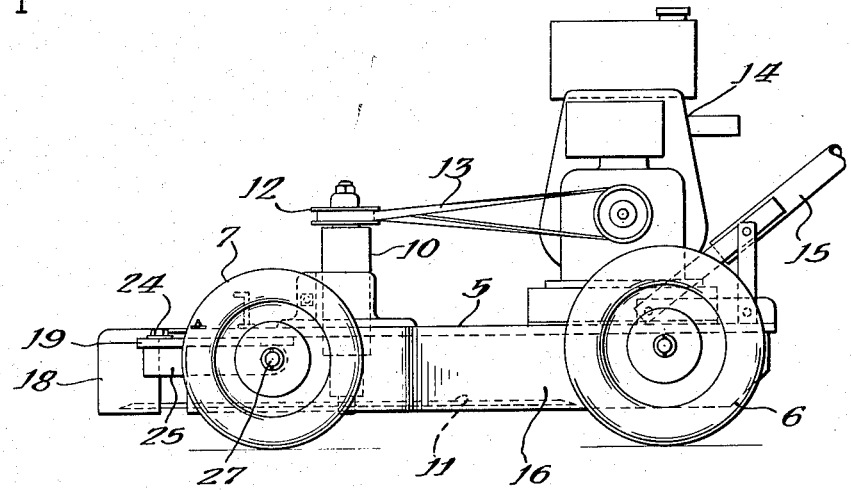
Figure 2:
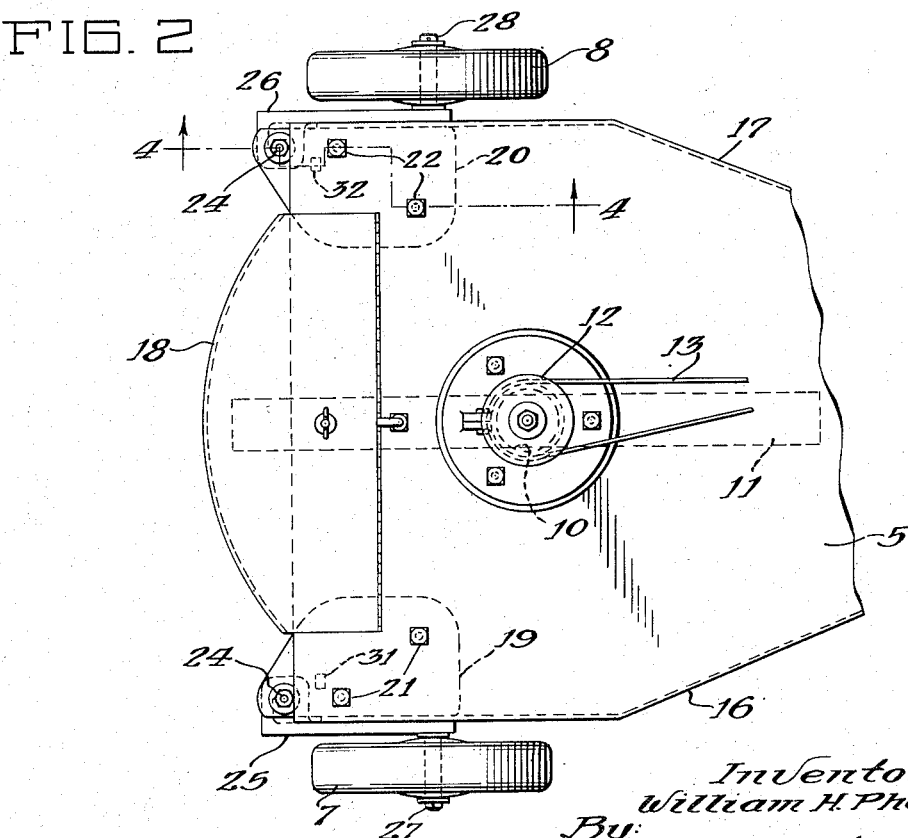

The invention is illustrated in a preferred embodiment in the accompanying drawings in which Fig. 1 is a side elevation of a mower embodying the invention; Fig. 2 is a fragmentary plan view showing the swingable front wheel supports; Fig. 3 is a bottom plan view similar to Fig. 2, showing the front wheel supports in full line at their position alongside the platform and in broken lines at their position in front of the platform, and Fig. 4 is an enlarged section taken as indicated on the line 4—4 of Fig. 2.

Referring to the drawings in greater detail, the mower comprises a platform 5 supported on a pair of rear wheels 6 and upon front wheels 7 and 8. Mounted on the platform is a vertical mower head assembly 10 the lower end of which extends through an aperture in the platform and has a horizontally disposed mower blade 11 secured to it. The mower head assembly 10 includes a pulley 12 to receive a belt 13 through which the mower head is driven off a gasoline motor 14 at the rear of the platform 5. A suitable handle 15 extends upwardly and rearwardly from the platform to provide means for pushing and guiding the mower. Depending skirts 16 and 17 are affixed to the longitudinal margins of the platform 5, and an arcuate front guard 18 extends substantially across the front of the mower platform 5 to protect the mower blades 11 from damage by contact with trees, walls, fences or the like.

As best seen in Figs. 3 and 4, the front wheel mounting includes a pair of mounting plates 19 and 20 which are secured by bolts 21 and 22, respectively, beneath the mower platform 5 with their outer longitudinal edges abutting against the skirts 16 and 17 respectively. Each mounting plate has a pivot socket 23 projecting forward of the platform 5 adjacent the outer edge of the platform. The pivot sockets 23 are apertured to receive bolts and nuts 24 which serve as pivot pins upon which front wheel shifter arms 25 and 26 are pivotally mounted for 180° movement between the full line position of Fig. 3 and the broken line position of Fig. 3. Each of the shifter arms is L-shaped and has its pivot upon one arm of the L. The second arm of the L of each of the shifter arms 25 and 26 is apertured adjacent its free end to receive the stub axles 27 and 28, respectively, upon which are rotatably mounted the wheels 7 and 8, respectively. The axles extend through the shifter arms and are threaded to receive nuts 27a and 28a. The shifter arms are so dimensioned that their free arms lie flat against the skirts 16 and 17 in the laterally extending retracted position of the wheels 7 and 8, and the skirts 16 and 17 are apertured or slotted (see Fig. 4) to accommodate the axle ends. Said free arms are of such length that the wheels 7 and 8 just clear the arcuate guard member 18 when they are in their position in front of the platform 5.

The mounting plates 19 and 20 have guide surfaces 29 and 30, respectively, which extend inwardly and rearwardly from the pivot portions 23 so as to direct weeds adjacent the edge of the mower platform into the path of the mower blades.

In order to shift the front wheels from one position to the other it is merely necessary to loosen the nuts and bolts 24, elevate the front of the platform 5 slightly, and swing the shifter arms 25 and 26 to the desired position. The nuts and bolts may then be tightened to fix the shifter arms 25 and 26 firmly in place. The guard skirts 16 and 17 fix the alignment of the wheels in their retracted position, and bumps 31 and 32 on the mounting plates 19 and 20 limit the pivotal motion of the shifter arms to align the wheels in their reversed forwardly extending positions.

The foregoing detailed description is given for clearness of understanding only and no unnecessary limitations should be understood therefrom as modifications will be obvious to those skilled in the art.

I claim:

1. In a power mower of the type which has a frame and four supporting wheels with a horizontally rotatable blade beneath the frame, means for connecting at least one of the wheels to the frame, comprising: a shifter arm having a central portion and oppositely extending end portions, one end portion forming a stub axle for the wheel and the other end portion forming a bearing for connection to the frame; and interengaging means operatively connecting said last mentioned end portion to the frame, said interengaging means being capable of being loosened to permit said arm and wheel to be swung from a position alongside said frame 180° to a position in which said wheels will lie within the lateral confines of the frame.

2. In a power mower of the type which has a frame and four supporting wheels with a horizontally rotatable blade beneath the frame, means for connecting at least one of the wheels to the frame, comprising: a mounting plate secured to a front corner of the frame with a horizontally disposed portion projecting forwardly of the frame; a shifter arm having a central portion and oppositely extending end portions, one end portion forming a stub axle for the wheel and the other end portion forming a bearing for connection to the mounting plate; interengaging means operatively connecting said last mentioned end portion to said mounting plate, said interengaging means being capable of being loosened to permit said arm and wheel to be swung from a position alongside said frame 180° to a position in which said wheels will lie within the lateral confines of the frame.

3. The power mower of claim 2 in which a depending guard skirt extends along each side of the frame, and the shifter arms abut against the guard skirt in their retracted positions.

4. The power mower of claim 2 in which the mounting plates have inwardly and rearwardly directed guide faces to direct weeds toward the mower blades.

5. In a power mower of the type which has a frame and four supporting wheels with a horizontally rotatable blade beneath the frame, means for connecting at least one of the wheels to the frame comprising: a shifter arm one end of which has a laterally extending portion forming a stub axle for the wheel and the other end portion of which forms a bearing for connection to the frame; interengaging means operatively connecting said last mentioned end portion to the frame, said interengaging means being capable of being loosened to permit said arm and wheel to be swung from a position alongside said frame 180° to a position in which said wheel will lie within the lateral confines of the frame.

6. In a power mower of the type which has a frame and four supporting wheels with a horizontally rotatable blade beneath the frame, means for connecting at least one of the wheels to the frame, comprising: a shifter arm one end portion of which forms a bearing for connection to the frame; a laterally projecting stub axle for the wheel secured to the other end of the shifter arm; interengaging means operatively connecting said one end portion of the shifter arm to the frame, said interengaging means being capable of being loosened to permit said arm and wheel to be swung from a position alongside said frame to a position in which said wheel will lie within the lateral confines of the frame.

7. A power mower comprising: a frame which tapers rearwardly at both sides; a pair of rear wheels mounted on the tapered portions of said frame so that the span across the rear wheels is less than the width of the forward portion of the frame; a horizontally rotatable mower blade journalled beneath the frame; means for driving said mower blade; a pair of shifter arms each of which has a central portion and oppositely extending end portions, one end portion forming a stub axle for a front wheel and the other end portion forming a bearing for connection to the frame; interengaging means operatively connecting said last mentioned end portion of each shifter arm to the frame, said interengaging means being capable of being loosened to permit said arm to be swung from a position alongside said frame 180° to a position in which said stub axles lie within the lateral confines of the frame; and a front wheel journalled on each stub axle.

WILLIAM H. PHELPS.

References Cited in the file of this patent

UNITED STATES PATENTS

| Number | Name | Date |
|---|---|---|
| 2,263,368 | Sejkora | Nov. 18, 1941 |
| 2,329,185 | Coddington | Sept. 14, 1943 |
| 2,351,830 | Mitchell et al. | June 20, 1944 |
| 2,474,557 | Templeton | June 28, 1949 |
| 2,514,407 | May | July 11, 1950 |
| 2,559,897 | Phelps | July 10, 1951 |
| 2,577,290 | Underwood | Dec. 4, 1951 |

FOREIGN PATENTS

| Number | Country | Date |
|---|---|---|
| 53,096 | France | Sept. 7, 1945 |